(12) United States Patent
Miura (10) Patent No.: US 8,251,170 B2
(45) Date of Patent: Aug. 28, 2012

(54) INTAKE STRUCTURE OF VEHICLE (75) Inventor: Takayoshi Miura, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 418 days.

(21) Appl. No.: 12/534,806

(22) Filed: Aug. 3, 2009

(65) Prior Publication Data
US 2010/0078240 A1    Apr. 1, 2010

(30) Foreign Application Priority Data
Sep. 30, 2008  (JP) ................. 2008-253174

(51) Int. Cl.
*B60K 13/02*    (2006.01)
(52) U.S. Cl. ..................... 180/68.3; 180/68.1
(58) Field of Classification Search ............. 180/68.1, 180/68.2, 68.3
See application file for complete search history.

(56) References Cited

U.S. PATENT DOCUMENTS

| | | | | |
|---|---|---|---|---|
| 5,860,685 A * | 1/1999 | Horney et al. | ................ | 293/113 |
| 7,022,152 B2 * | 4/2006 | Tsuruta et al. | ............... | 55/385.3 |
| 7,438,147 B2 * | 10/2008 | Kato et al. | ................... | 180/68.1 |
| 7,717,206 B2 * | 5/2010 | Tanaka et al. | ................ | 180/68.3 |
| 7,819,220 B2 * | 10/2010 | Sunsdahl et al. | .............. | 180/312 |
| 2008/0083575 A1 * | 4/2008 | Smith | ......................... | 180/68.3 |

FOREIGN PATENT DOCUMENTS

JP    2006-103378    4/2006

* cited by examiner

*Primary Examiner* — John Walters
(74) *Attorney, Agent, or Firm* — Ditthavong Mori & Steiner, P.C.

(57) ABSTRACT

An intake structure for a vehicle includes a vehicle body frame, a pair of occupant seats, an internal combustion engine, and an air cleaner. The pair of occupant seats are arranged side by side in a vehicle width direction in the vehicle body frame and includes a driver's seat and a passenger seat. The internal combustion engine is configured to generate a driving force. The air cleaner is configured to purify air and supply the purified air to the internal combustion engine. The air cleaner includes a first air cleaner chamber and a second air cleaner chamber that are disposed to sandwich a part of the vehicle body frame.

4 Claims, 12 Drawing Sheets

INTAKE STRUCTURE OF VEHICLE

CROSS-REFERENCE TO RELATED APPLICATIONS

The present application claims priority under 35 U.S.C. §119 to Japanese Patent Application No. 2008-253174, filed Sep. 30, 2008. The contents of this application are incorporated herein by reference in their entirety.

BACKGROUND OF THE INVENTION

1. Field of the Invention

The present invention relates to an intake structure for a vehicle.

2. Discussion of the Background

There has heretofore been known a vehicle structure in which an air cleaner is disposed in a rear frame portion (refer to, for example, Japanese Patent Application Publication No. 2006-103378). The vehicle frame structure of a vehicle described in Japanese Patent Application Publication No. 2006-103378 includes a front frame portion, a center frame portion, and the rear frame portion. In the vehicle frame structure, the air cleaner is disposed in a space surrounded by rear lower frames and side frames of the rear frame portion.

It is required that such an air cleaner have a predetermined capacity or more in order to maintain a favorable engine performance. However, if the vehicle body is reduced in size, the position to dispose an air cleaner is limited, thus leading to a problem that it is difficult to dispose an air cleaner having a required capacity secured.

SUMMARY OF THE INVENTION

According to one aspect of the present invention, an intake structure for a vehicle includes a vehicle body frame, a pair of occupant seats, an internal combustion engine, and an air cleaner. The pair of occupant seats is arranged side by side in a vehicle width direction in the vehicle body frame and includes a driver's seat and a passenger seat. The internal combustion engine is configured to generate a driving force. The air cleaner is configured to purify air and supply the purified air to the internal combustion engine. The air cleaner includes a first air cleaner chamber and a second air cleaner chamber that are disposed to sandwich a part of the vehicle body frame.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

The embodiments will now be described with reference to the accompanying drawings, wherein like reference numerals designate corresponding or identical elements throughout the various drawings.

Hereinafter, an embodiment according to an intake structure for a vehicle according to an embodiment of the present invention will be described by giving an MUV (multi utility vehicle) as an example. Note that the drawings should be viewed in the direction of orientation of reference numerals.

Figure 1:
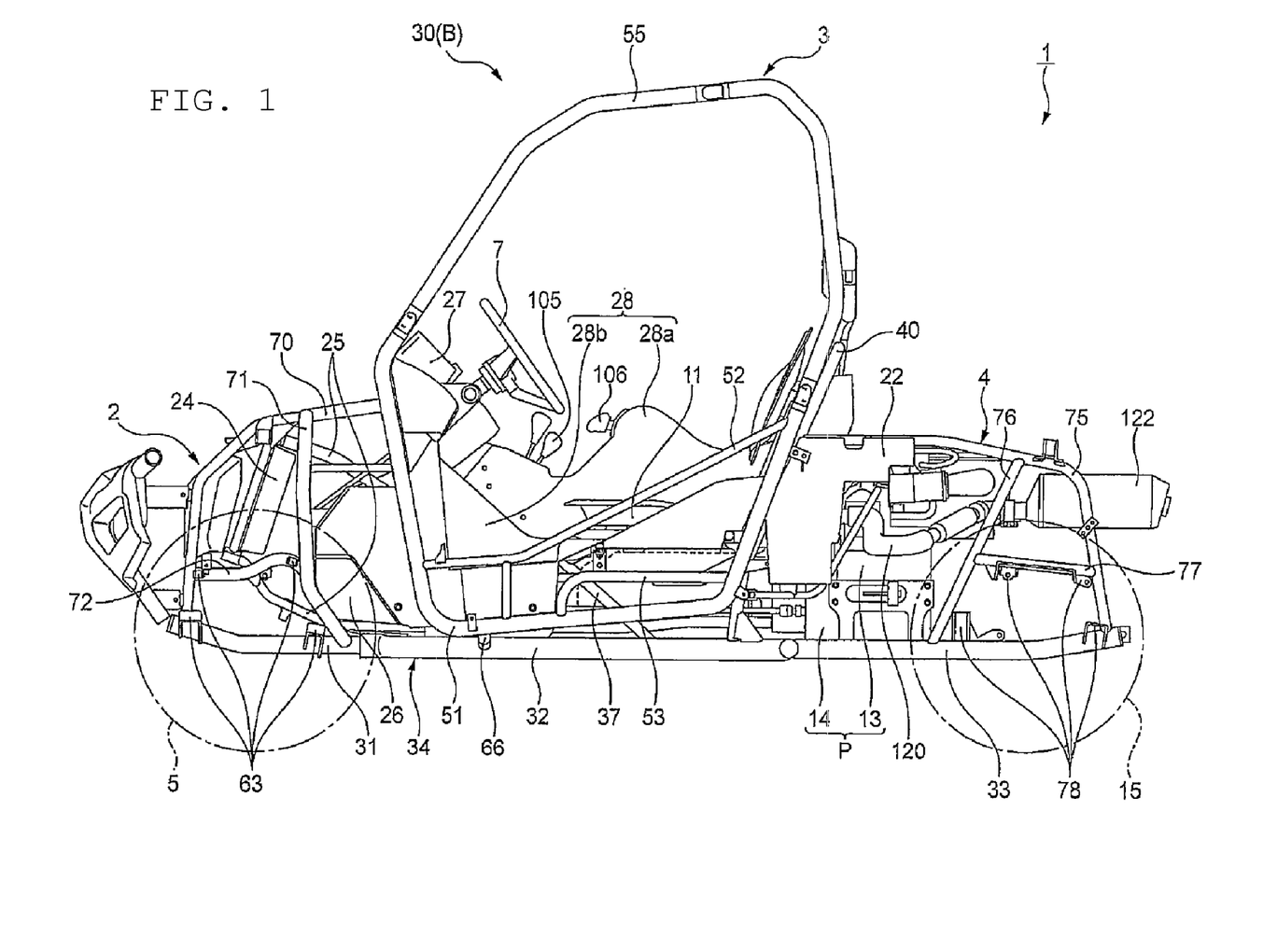
FIG. 1 is a left-side view of a vehicle employing an intake structure for a vehicle according to an embodiment of the present invention.
Figure 2:
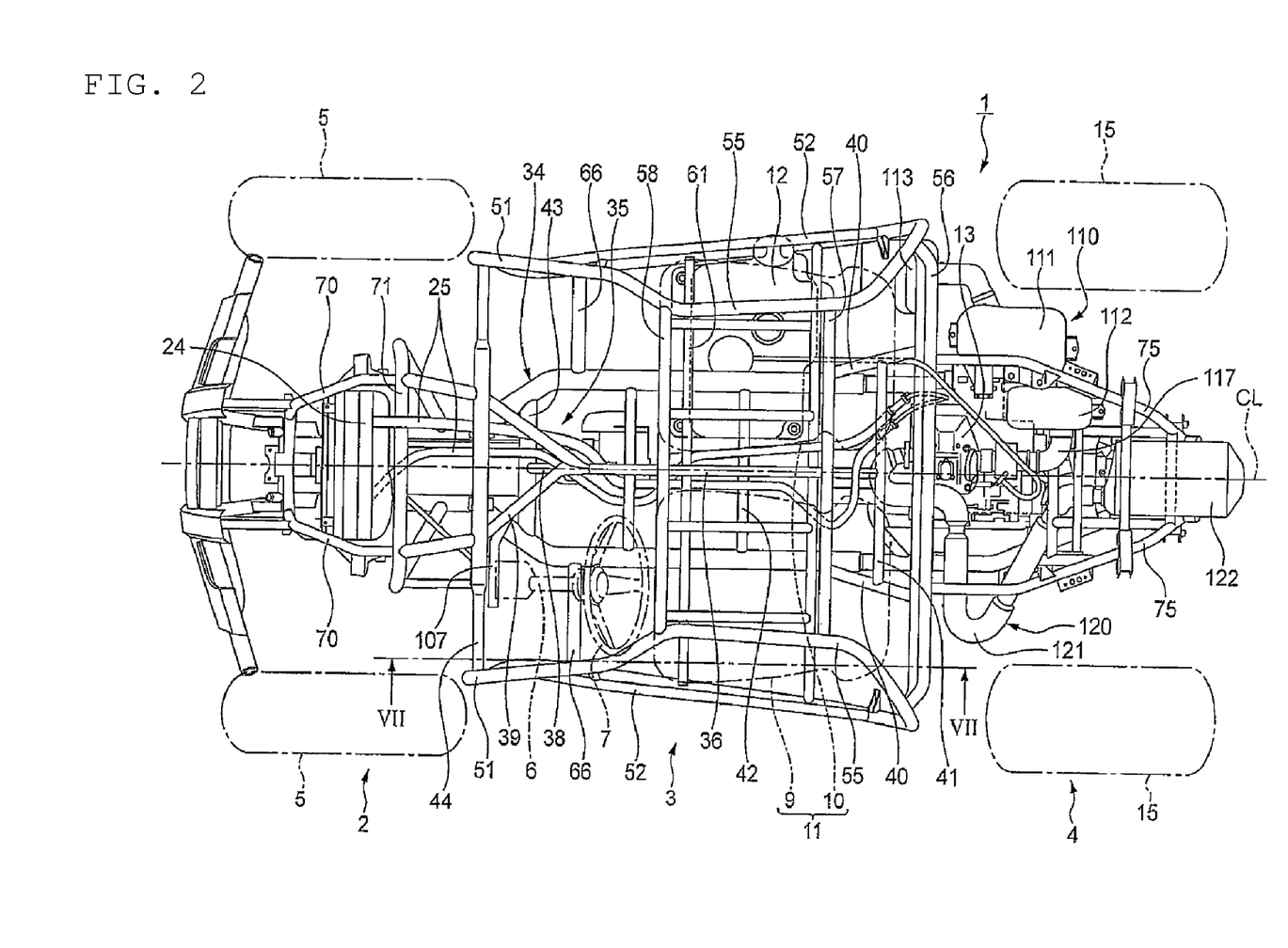
FIG. 2 is a plan view of the vehicle illustrated in FIG. 1.
Figure 3:
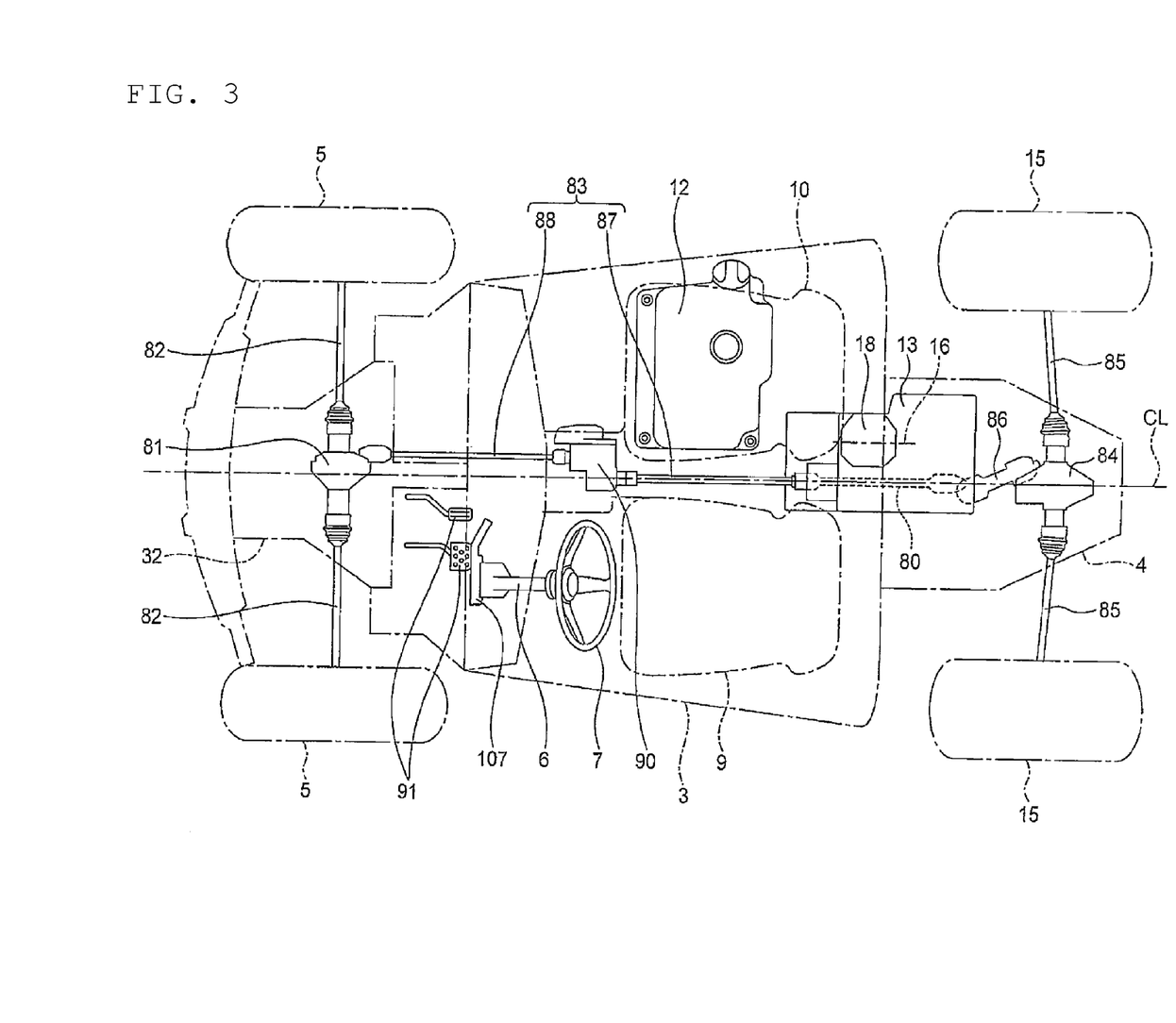
FIG. 3 is a plan view of chief parts of a power transmission mechanism of the vehicle illustrated in FIG. 1.

As illustrated in FIGS. 1 to 3, a vehicle 1 according to the embodiment includes a vehicle body frame 30 which includes a front frame portion 2, a center frame portion 3, and a rear frame portion 4 so as to constitute a vehicle body B. A front-wheel suspension system (not illustrated) which suspends left and right front wheels 5 is attached to the front frame portion 2. In addition, a front-wheel drive system including a front differential gear unit 81, front drive shafts 82, and the like; steering members (including a steering shaft 6 and a steering wheel 7 attached to an upper end of the steering shaft 6) for steering the front wheels 5; and the like are supported on the front frame portion 2.

A pair of occupant seats 11, constituting a driver's seat 9 and a passenger seat 10 arranged side by side in a vehicle width direction, are attached to the center frame portion 3, so that a space for occupants is formed. A fuel tank 12 is disposed in a space below the passenger seat 10. A front propeller shaft 83 coupling a power unit P and a front differential gear unit 81 is disposed between the driver's seat 9 and the passenger seat 10.

A rear-wheel suspension system (not illustrated) which suspends left and right rear wheels 15 is attached to the rear frame portion 4. In addition, a rear-wheel drive system including, for example, a rear propeller shaft 86, a rear differential gear unit 84, rear drive shafts 85; and the like are supported on the rear frame portion 4 in addition to the power unit P including an internal combustion engine 13 and a transmission 14.

As illustrated in FIG. 3, the power unit P supported on the rear frame portion 4 is laid out vertically in such a manner that a crankshaft 16 of the internal combustion engine 13 is directed in a front-rear direction of the vehicle body. An output shaft 80 to which a driving force is transmitted from the crankshaft 16 is disposed substantially on a center line CL of the vehicle body. The output shaft 80 is coupled at a front end thereof to the front propeller shaft 83 and is coupled at a rear end thereof to the rear propeller shaft 86.

The rear propeller shaft 86 is connected to the rear differential gear unit 84 disposed substantially on the center line CL of the vehicle body. The driving force of the internal combustion engine 13 is transmitted to the left and right rear wheels 15 via the rear propeller shaft 86, the rear differential gear unit 84, and then the rear drive shafts 85 connected to the rear differential gear unit 84.

The front propeller shaft 83 is provided with a reduction gear 90 at an intermediate portion of the front propeller shaft 83. The front propeller shaft 83 is constituted of a first propeller shaft 87 and a second propeller shaft 88. The first propeller shaft 87 is disposed at the rear of the reduction gear 90, while the second propeller shaft 88 is disposed at the front of the reduction gear 90. The reduction gear 90 transmits the rotational force of the first propeller shaft 87 to the second propeller shaft 88 while converting the rotational direction of the first propeller shaft 87 into the reverse direction in order to rotate the front wheels 5 and the rear wheels 15 in the same direction. Accordingly, the driving force of the internal combustion engine 13 is transmitted to the left and right front wheels 5 via the first propeller shaft 87, the reduction gear 90, the second propeller shaft 88, the front differential gear unit 81, and then the front drive shafts 82 connected to the front differential gear unit 81.

Figure 8:
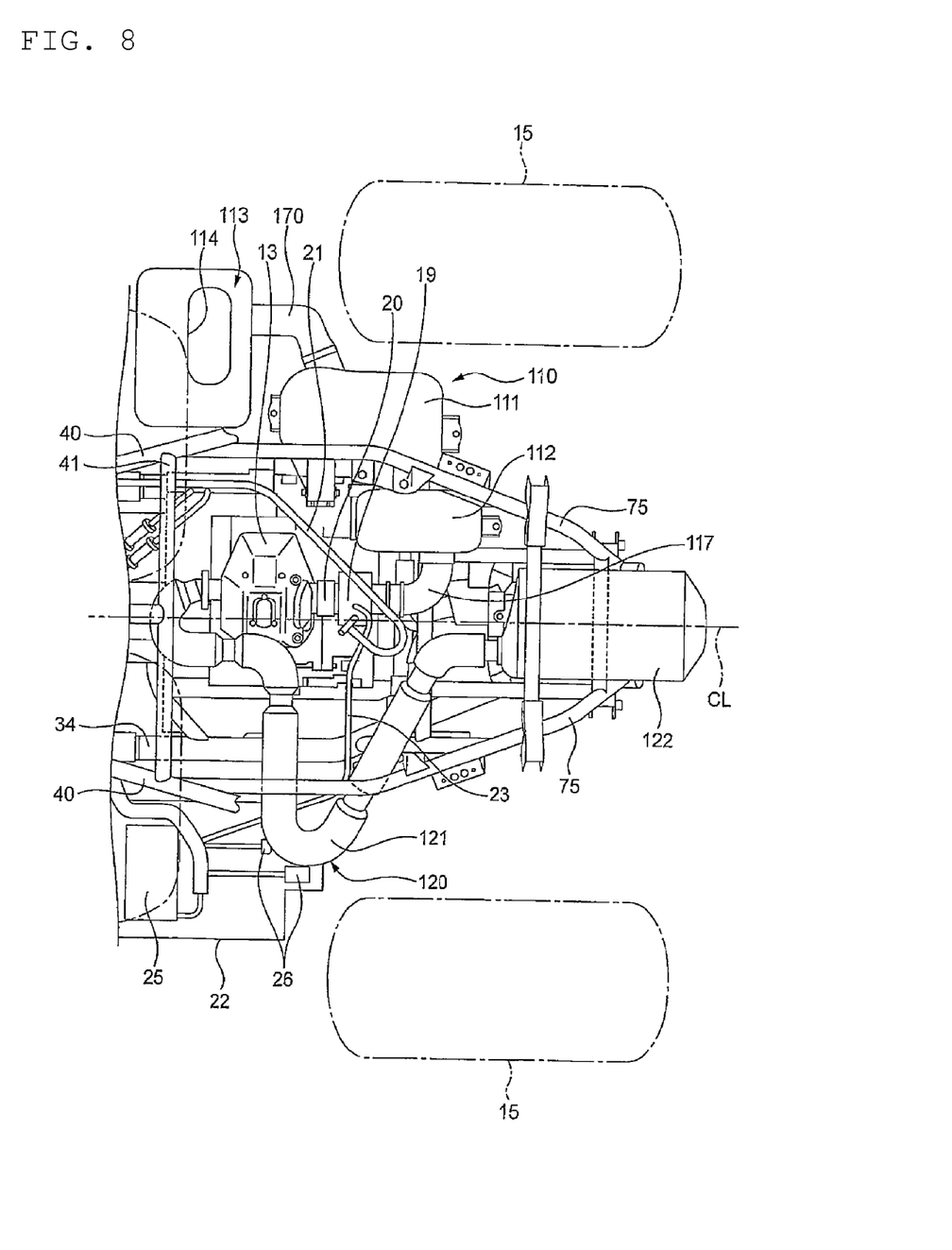
FIG. 8 is a plan view illustrating, in an enlarged manner, rear chief parts illustrated in FIG. 2.

As illustrated in an enlarged manner in FIG. 8, a throttle valve unit 19 is connected to a rear portion of a cylinder head 18 of the internal combustion engine 13 via an intake manifold 20. An exhaust pipe 120, which will be described later, is connected to a front portion of the cylinder head 18. An air cleaner 110 including first and second air cleaner chambers 111 and 112, which will be described later, is connected to a rear portion of the throttle valve unit 19 via a connecting tube 117. Moreover, a fuel supply pipe 21 and a wire harness 23 are connected to the throttle valve unit 19. The fuel supply pipe 21 extends from the fuel tank 12. The wire harness 23 is arranged to extend from a battery case 22 including the battery case 22, an ECU 26, and the like.

Figure 4:
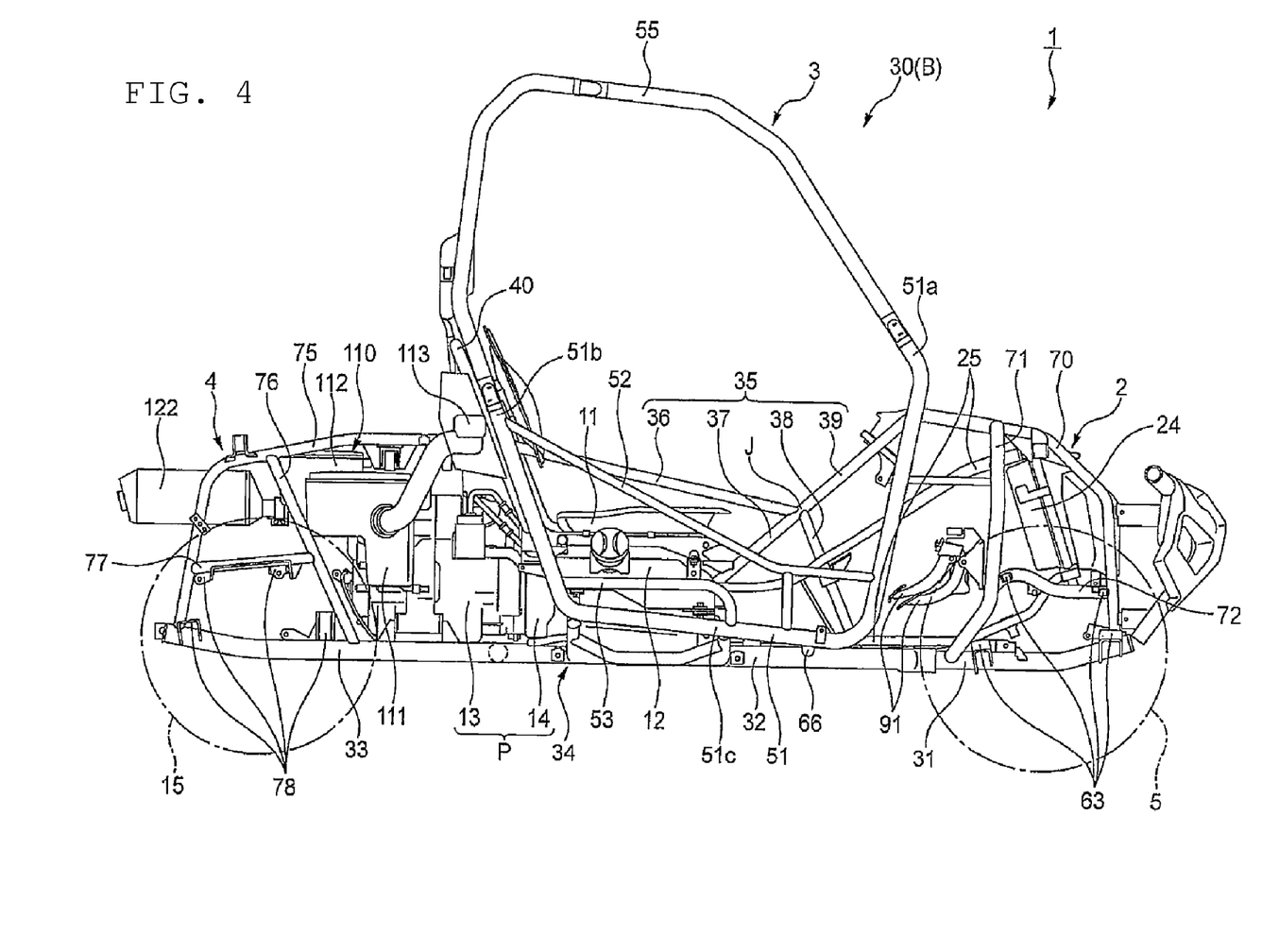
FIG. 4 is a right-side view of the vehicle illustrated in FIG. 1.

Moreover, as illustrated in FIGS. 2 and 4, a radiator 24 disposed in the front frame portion 2 is connected to the internal combustion engine 13 via two water supply pipes 25. Thus, cooling water for cooling the internal combustion engine 13 circulates between the radiator 24 and the internal combustion engine 13 through the water supply pipes 25.

Note that, in FIG. 1, reference numeral 26 denotes a front cover; reference numeral 27 denotes an instrument panel; reference numeral 28 denotes a center console cover including a center cover member 28*a* as well as a pair of left and right cover members 28*b*.

Figure 5:
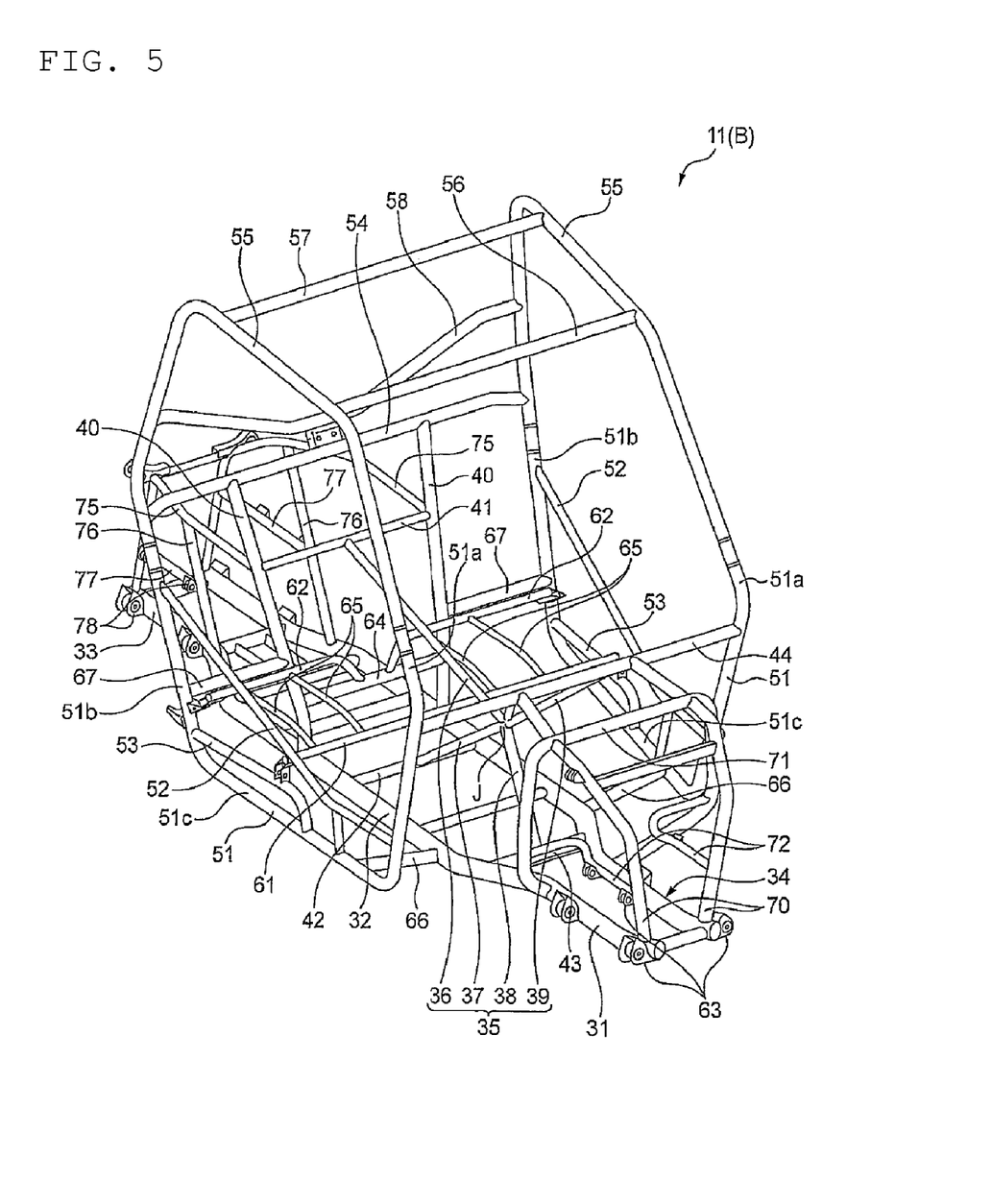
FIG. 5 is a perspective view illustrating a frame structure of the vehicle illustrated in FIG. 1.

As illustrated in FIGS. 4 and 5, the vehicle body frame 30 includes a pair of lower frames 34 disposed respectively in left and right lower portions of the vehicle body B and extending in the front-rear direction. Each of the lower frames 34 forms a front lower frame 31, a center lower frame 32, and a rear lower frame 33.

In the front frame portion 2, a pair of left and right front upper frames 70 extend upward from front ends of the respective front lower frames 31, further extend rearward, and then are joined to a front upper cross-member 44. In this manner, the left and right front upper frames 70 cover a front portion of the vehicle body B from above. The front lower frames 31 and the front upper frames 70 are coupled to one another by a square U-shaped frame 71.

In addition, rising portions of the square U-shaped frame 71 are coupled respectively to rising portions of the front upper frames 70 by front-suspension support pipes 72 each formed into a substantially L-shape. Two brackets 63 are fixed onto each of the front lower frames 31 and the front-suspension support pipes 72, and the front-wheel suspension system is swingably disposed on the brackets 63. The front-wheel suspension system rotatably suspends the left and right front wheels 5.

On the other hand, in the rear frame portion 4, a pair of left and right rear upper frames 75 extend upward from rear ends of the rear lower frames 33, thereafter are bent to extend frontward in such a manner as to cover the power unit P including the internal combustion engine 13, and then are joined respectively to a pair of center upright frames 40. The center upright frames 40 extend upward from portions, behind the occupant seats 11, of the respective center lower frames 32. Horizontal portions of the rear upper frames 75 are vertically connected to the rear lower frames 33 respectively by rear upright frames 76, each of which is inclined frontward while extending downward. Moreover, the rear upright frames 76 are connected respectively to perpendicular portions of the corresponding rear upper frames 75 respectively by rear-suspension support pipes 77.

Two brackets 78 are fixed respectively onto front and rear portions of each of the rear lower frames 33 and the rear-suspension support pipes 77. The rear-wheel suspension system is swingably disposed on the four brackets 78 in total. The rear-wheel suspension system suspends the left and right rear wheels 15 in a manner that the rear wheels 15 are rotatable.

In the center frame portion 3, a pair of left and right side frames 51, which extend in the front-rear direction, are disposed respectively outside the center lower frames 32 in the vehicle width direction. The side frames 51 are joined to the respective lower frames 34 by connecting pipes 66 and connecting pipes 67. The connecting pipes 66 are connected to front portions of the respective center lower frames 32, while the connecting pipes 67 are connected to intermediate portions of the respective center upright frames 40.

Each of the side frames 51 includes a front rising portion 51*a*, a rear rising portion 51*b*, and a horizontal portion 51*c* joining the front and rear rising portions 51*a* and 51*b*, and is thus formed in a substantially square U-shape, which is convex downward.

In each of the substantially square U-shaped side frames 51, the front rising portion 51*a* and the rear rising portion 51*b* are coupled to each other by a side pipe 52 in the front-rear direction. End portions of the respective front rising portions 51*a* of the pair of side frames 51 are coupled to each other by the front upper cross-member 44 in the vehicle width direction. Middle portions of each rear rising portion 51*b* and the corresponding horizontal portion 51*c* are coupled to each other by a seat supporting pipe 53 having a substantially L shape.

A pair of side upper frames 55, each formed into a substantially square U shape, are each connected to the front rising portion 51*a* and the rear rising portion 51*b* of a corresponding one of the pair of side frames 51 in such a manner that the side upper frame 55 is convex upward. The pair of side upper frames 55 are coupled to each other in the vehicle width direction by: a first upper cross-member 54, to which the pair of center upright frames 40 are joined at upper end portions thereof; two roof cross-members 56 and 57; and a cross-member 58 for headrest, which is joined at a middle portion thereof to the first upper cross-member 54.

Figure 9:
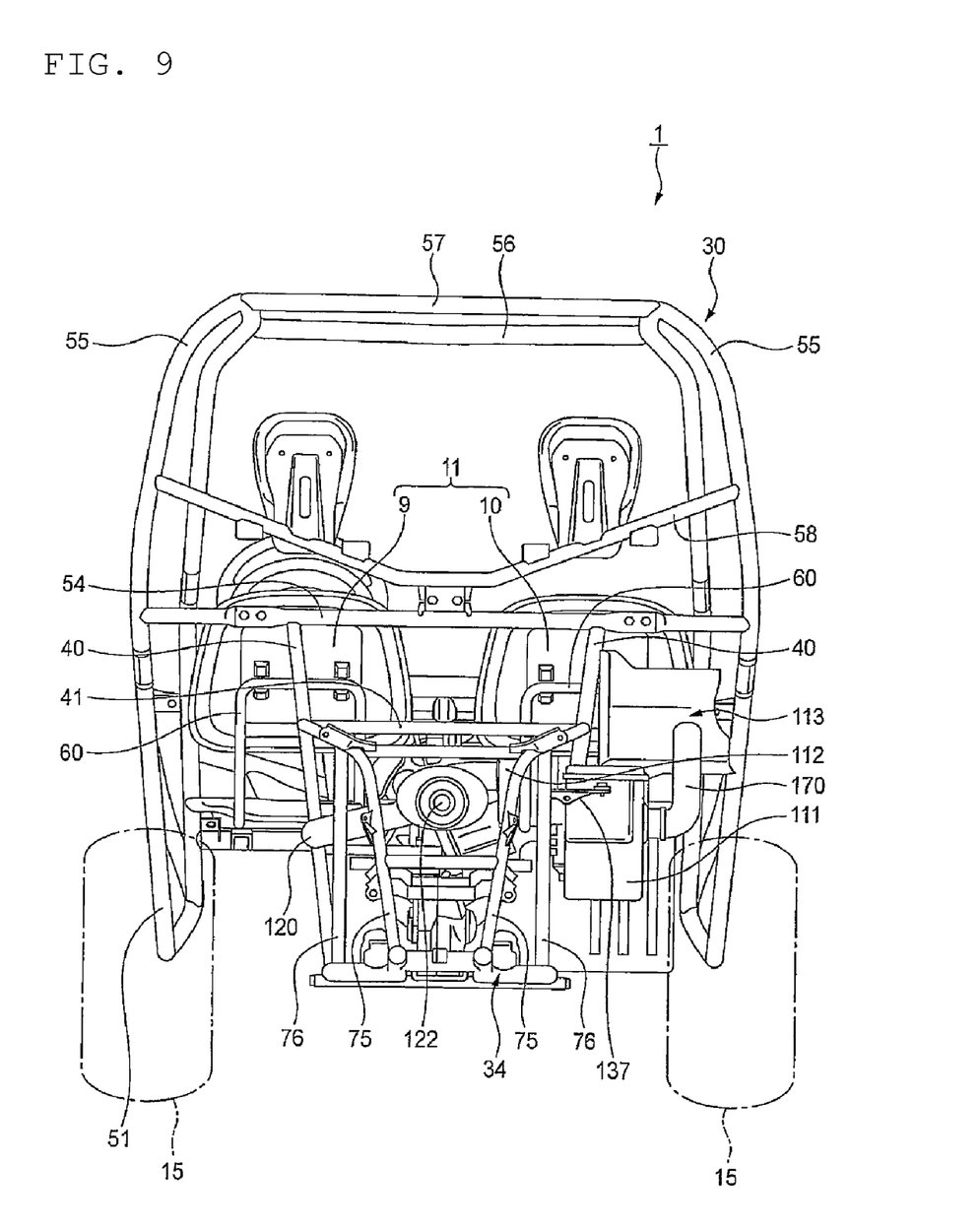
FIG. 9 is a rear view of the vehicle illustrated in FIG. 1.

A first seat cross-member 61 is laid between the pair of seat supporting pipes 53 with brackets therebetween. In addition, a pair of second seat cross-members 62 are joined to the rear rising portions 51*b* of the respective side frames 51 with brackets therebetween. The second seat cross-members 62 are joined to a rear cross-member 64 which connects the pair of center upright frames 40 to each other at portions lower than the middle portions thereof. The first and second seat cross-members 61 and 62 as well as coupling frames 65, which couple the respective second seat cross-members 62 to the first seat cross-member 61 in the front-rear direction, constitute seat frames. Seat pipes 60 (refer to FIG. 9) for the driver's seat 9 and the passenger seat 10 are attached to the seat frames.

In addition, in the center frame portion 3, a center pipe 35 is provided. The center pipe 35 passes between the driver's seat 9 and the passenger seat 10 and is arranged above the lower frames 34 to extend in the front-rear direction substantially on the center line CL of the vehicle body. Accordingly, the center frame portion 3 has a structure in which the center pipe 35 and the pair of lower frames 34 are disposed respectively on the upper and lower sides in the center portion in the vehicle width direction, and the side pipe 52 and the side frame 51 are disposed on the upper and lower sides in each of the side portions. This structure makes it possible to improve the rigidity of the center frame portion 3 as well as to achieve a low floor and a low center of gravity.

Figure 7:
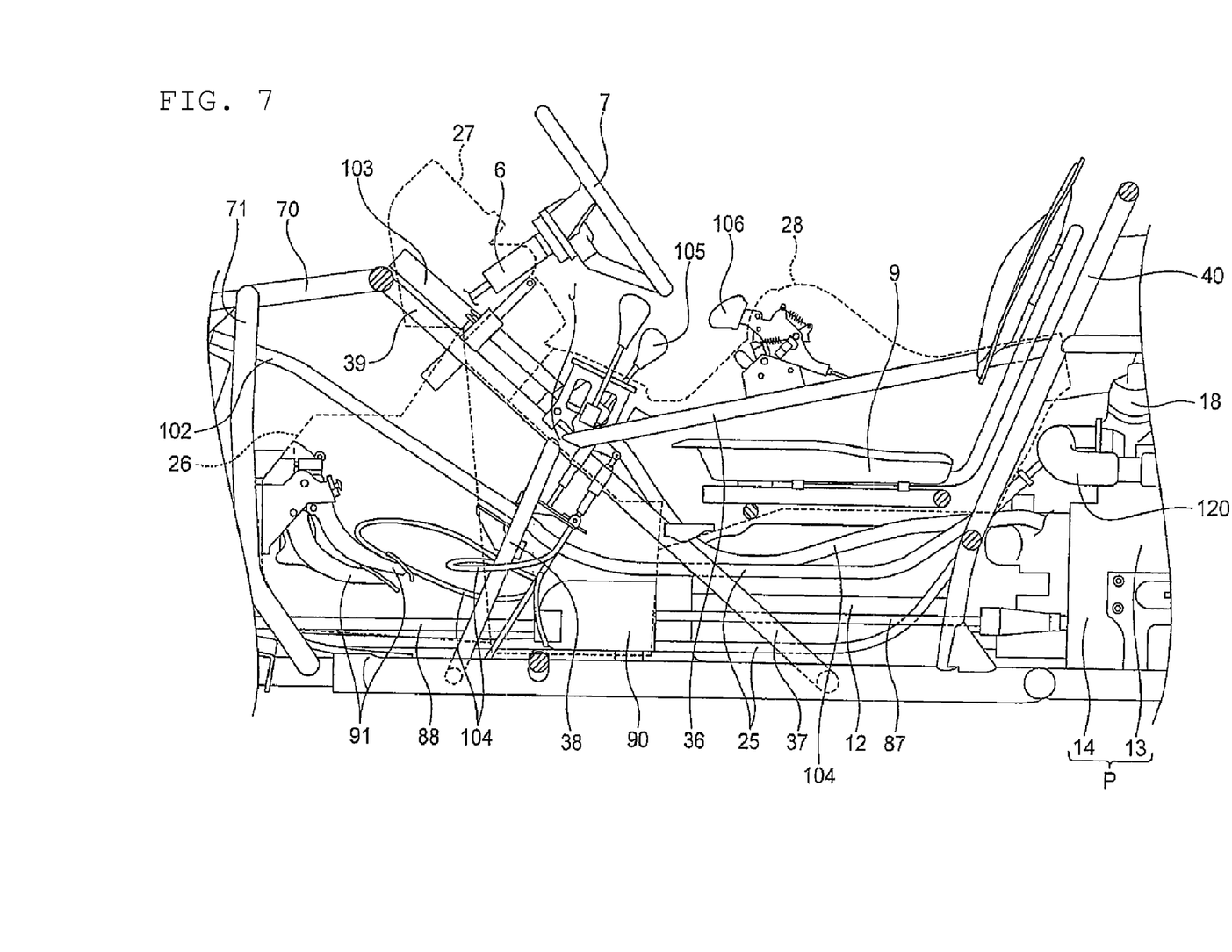
FIG. 7 is a side view taken along the line VII-VII in FIG. 2, and illustrating, in an enlarged manner, an inside of a center console cover.

As illustrated in an enlarged manner also in FIG. 7, the center pipe 35 includes an upper center pipe 36, a down center pipe 37, an upright center pipe 38, and a front center pipe 39. These members 36, 37, 38, and 39 are joined together at a joint point J located in front of the occupant seats 11.

The upper center pipe 36 extends frontward while being joined at one end thereof to a center portion of a rear upper cross-member 41 which couples the pair of center upright frames 40 to each other. The down center pipe 37 extends upward and frontward while being joined at one end thereof to a center portion of a rear lower cross-member 42 which is laid between the center lower frames 32 at a position below the occupant seats 11.

The upright center pipe 38 extends rearward and upward while being joined at one end thereof to a center portion of a front lower cross-member 43 which is laid between the center lower frames 32 at a position in front of the occupant seats 11. The front center pipe 39 is a pipe member that is formed into a substantially V shape with two branches extending frontward respectively to the left and right from the joint point J as the base point. An end portion of each of the left and right branches is joined to the front upper cross-member 44 in a vicinity of the joint portion of a corresponding one of the front upper frames 70 to the front upper cross-member 44.

On the center pipe 35 constituted as described above, a shift lever 105 is attached to a portion above a vicinity of the joint point J having increased rigidity, and a side-brake lever 106 is attached to a portion above an intermediate portion of the upper center pipe 36. Note that, the steering shaft 6, which is a steering member, is attached to the front upper cross-member 44 with a subframe 107 interposed therebetween. Wires extend from the shift lever 105, the side-brake lever 106, and the steering shaft 6, as well as from foot controls 91, such as a brake pedal and an acceleration pedal, disposed on the driver's seat 9 side, and the like. These extending wires are gathered in an electric connection box 103, and then bundled into a single wire harness 104, which is eventually connected to the battery case 22 provided behind the driver's seat 9.

In addition, as illustrated in FIGS. 2, 3 and 7, the first propeller shaft 87 is located below and along the center pipe 35 substantially on the center line CL of the vehicle body. The first propeller shaft 87 is disposed also in such a manner as to overlap the fuel tank 12 in a side view, in other words, in such a manner that the first propeller shaft 87 and the fuel tank 12 are arranged side by side in the vehicle width direction. The second propeller shaft 88 connected to the reduction gear 90 is disposed offset toward the passenger seat 10 in the vehicle width direction with respect to the first propeller shaft 87. Moreover, the second propeller shaft 88 is coupled, on the passenger seat 10 side, to the front differential gear unit 81 disposed substantially on the center line CL of the vehicle body above the front lower frames 31.

As described above, since the front propeller shaft 83 is arranged substantially along the center pipe 35, the torsion in the vehicle 1 is unlikely to act on the front propeller shaft 83. In addition, since the second propeller shaft 88 is disposed offset toward the passenger seat 10 in the vehicle width direction, a large space for occupants can be secured even with the lowered floor, and also, the flexibility in layout of the foot controls 91 is improved, so that the foot controls 91 can be disposed at positions where the foot controls 91 are easily operated.

Moreover, the reduction gear 90 is located in front of the pair of occupant seats 11, and also behind the foot controls 91, such as the brake pedal and acceleration pedal, disposed on the driver's seat 9 side, and is disposed between the down center pipe 37 and the upright center pipe 38.

Figure 6:
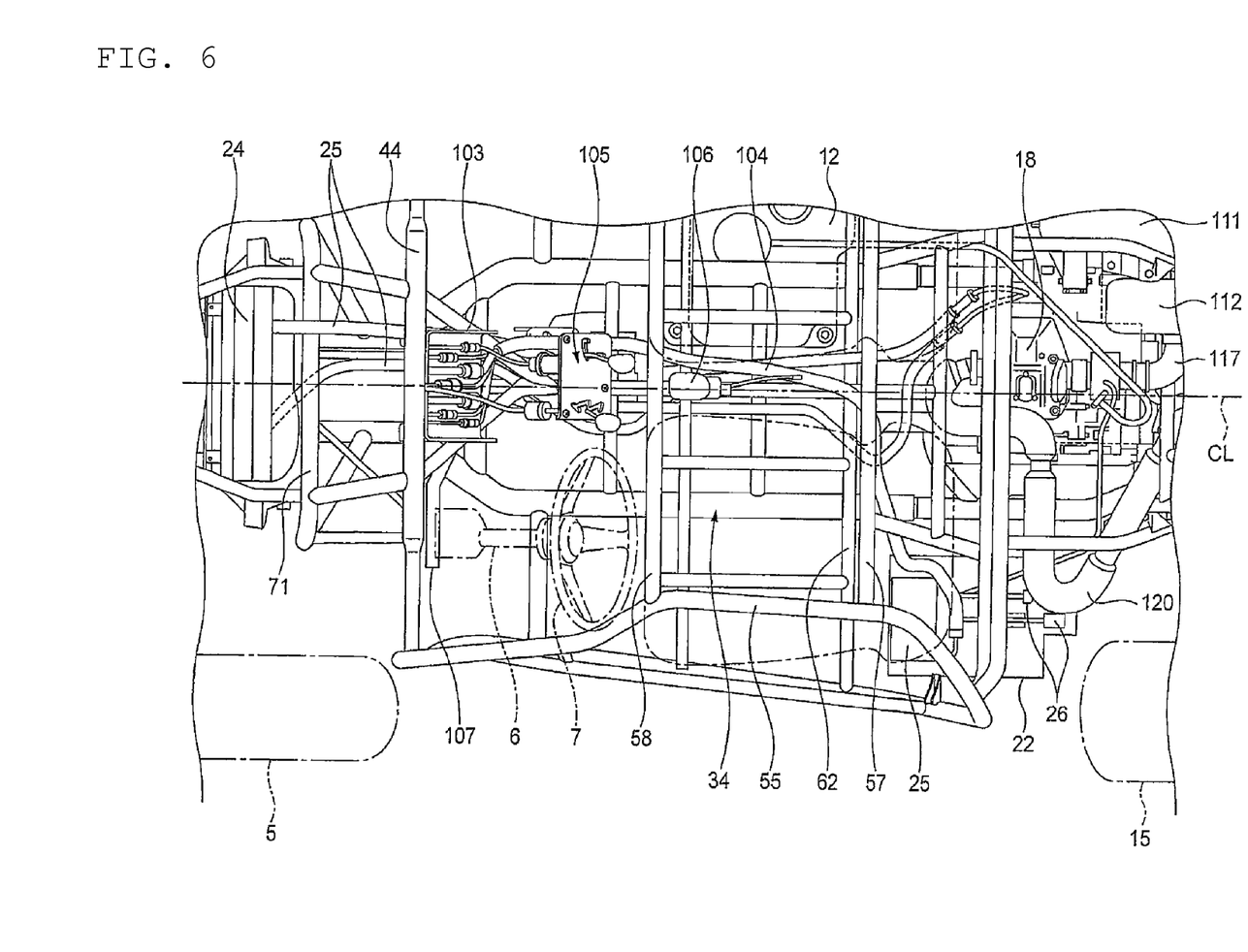
FIG. 6 is a plan view illustrating, in an enlarged manner, chief parts where wires are arranged.

The two water supply pipes 25, which connect the radiator 24 and the internal combustion engine 13, as well as the wire harness 104, which electrically connects the electric connection box 103 and the battery case 22, are also disposed offset toward the passenger seat 10 side in the vehicle width direction, partially in a region in front of the upright center pipe 38, as in the case of the front propeller shaft 83.

Accordingly, the center console cover 28 provided between the driver's seat 9 and the passenger seat 10 houses the center pipe 35, the front propeller shaft 83, the reduction gear 90, the water supply pipes 25, the wire harness 104, the shift lever 105, and the side brake lever 106, while a front portion of the center console cover 28 is offset toward the passenger seat 10 side.

With this arrangement, the water supply pipes 25 and the wire harness 104 are compactly arranged by utilizing the dead space. As a result, a large space for occupants can be secured, and also, the flexibility in layout of the foot controls 91 is improved, so that the foot controls 91 can be disposed at positions where the foot controls 91 are easily operated.

Further, while the vehicle body frame 30 is formed in a bilaterally symmetrical arrangement, the front differential gear unit 81, the reduction gear 90, the internal combustion engine 13, the rear differential gear unit 84, and the like, which are major heavy components, are disposed substantially on the center line CL of the vehicle body. As a result, a favorable weight balance between the left and right sides is achieved to increase the stability of the vehicle 1.

As illustrated in FIGS. 8 to 11, the air cleaner 110, which is an air-intake device, is disposed behind the passenger seat 10 on the right side of the internal combustion engine 13, and includes the first air cleaner chamber 111 and the second air cleaner chamber 112.

A snorkel 113 is connected to the first air cleaner chamber 111 via a snorkel duct 170 attached to an outer side surface of the first air cleaner chamber 111 in the vehicle width direction. The snorkel 113 is disposed behind the passenger seat 10 and has a cover 114 for covering its opening. The first air cleaner chamber 111 and the second air cleaner chamber 112 face each other in the vehicle width direction with the rear upright frame 76 on the corresponding side being partially sandwiched therebetween, and communicate with each other via a coupling tube 116. In addition, the second air cleaner chamber 112 is connected to the internal combustion engine 13 via the connecting tube 117.

Figure 10:
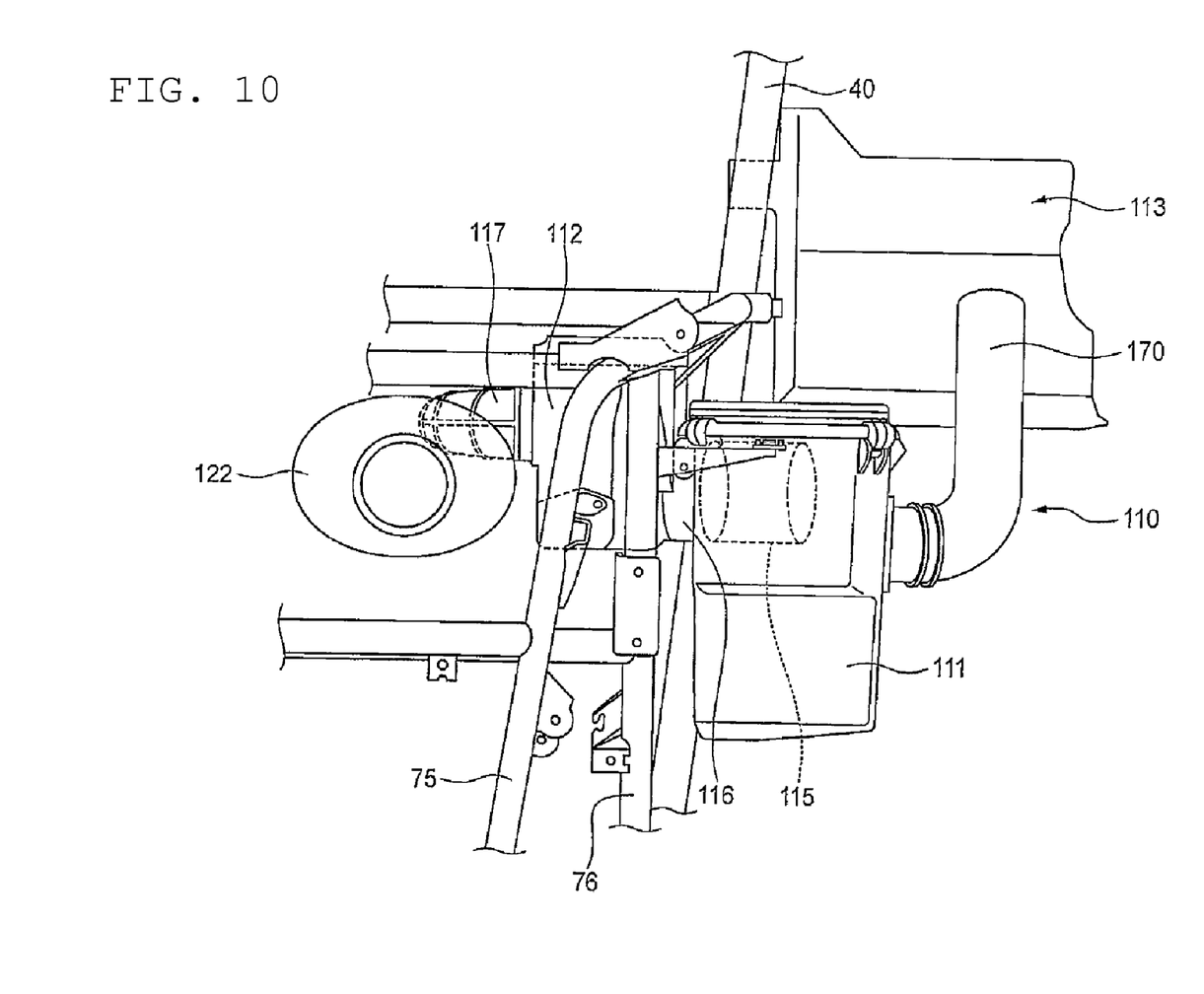
FIG. 10 is a rear view illustrating, in an enlarged manner, chief parts of an intake structure illustrated in FIG. 9.

Accordingly, the first air cleaner chamber 111 is disposed outside the corresponding rear upright frame 76 in the vehicle width direction, and the second air cleaner chamber 112 is disposed inside the rear upright frame 76 in the vehicle width direction.

Figure 11:
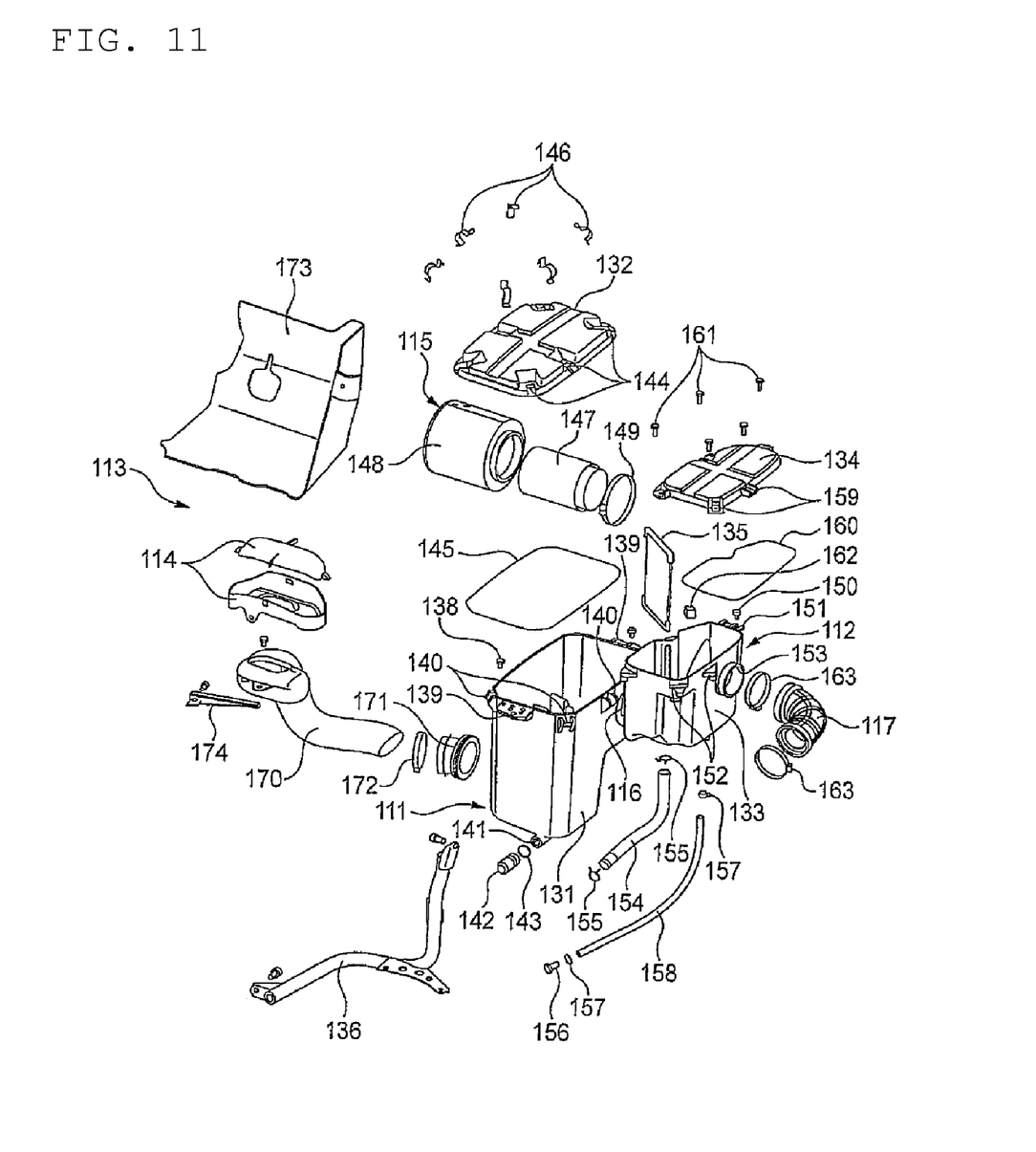
FIG. 11 is a perspective view illustrating an air cleaner.

Specifically as shown in FIG. 11, the first air cleaner chamber 111 is mainly constituted of a first air cleaner case 131, a first lid 132, and an air cleaner element 115, while the second air cleaner chamber 112 is mainly constituted of a second air cleaner case 133, a second lid 134, and a heat-shield plate 135.

The first air cleaner case 131 is made of resin and is opened upward. The first air cleaner case 131 includes frame-side support portions 139 on the upper edge portion thereof at positions facing each other in the front-rear direction. An air cleaner stay 136 and a stay 137 (refer to FIG. 9) extending from the rear upright frame 76 are fastened respectively to the frame-side support portions 139 with tapping screws 138. The first air cleaner case 131 also includes lid-fixing hooks 140 on the upper edge portion thereof at the corners and at positions opposite to each other in the vehicle width direction. Moreover, the first air cleaner case 131 includes attachment holes (not illustrated) in side surfaces thereof in the vehicle width direction. The coupling tube 116 and a snorkel tube 171, which is connected to the snorkel duct 170, are fixed to the attachment holes, respectively. Furthermore, the first air cleaner case 131 is provided with a drain hole 141 in a bottom portion thereof. A drain hose 142 is connected to the drain hole 141 and is fixed thereto with a hose band 143.

The first lid 132 is formed in a plate shape covering the upward opening of the first air cleaner case 131, and includes locking portions 144 at the corners and at positions opposite to each other in the vehicle width direction. The first lid 132 is mounted on the first air cleaner case 131 with a sealing member 145 sandwiched between the first lid 132 and the upper edge portion of the first air cleaner case 131, and is fixed thereto with six binders 146 each being locked, to a corresponding one of the hooks 140 of the first air cleaner case 131 on one side, and to a corresponding one of the locking portions 144 of the first lid 132 on the other side.

The air cleaner element 115 includes an element main body 147 and a body 148. The element main body 147 has a cylindrical shape and a closed end portion. The body 148 has a cylindrical shape. This element 115 is first inserted into the coupling tube 116 in a state where the element main body 147 is mounted to the body 148. Then, a hose band 149 is fitted onto the coupling tube 116, so that the inside of the element 115 is connected to the inside of the coupling tube 116. In this way, the element 115 is mounted in the first air cleaner case 131. The element 115 removes dust in the air introduced into the first air cleaner case 131, and supplies the purified air to the second air cleaner chamber 112 through the coupling tube 116.

The second air cleaner case 133 is also made of resin and is opened upward. The second air cleaner case 133 is disposed at a position higher than that of the first air cleaner case 131. The second air cleaner case 133 includes a frame-side support portion 151 on an upper edge portion thereof at a position on the rear side. A stay (not illustrated) extending from the rear upper frame 75 is fastened to the frame-side support portion 151 with a tapping screw 150. The second air cleaner case 133 also includes lid-fixing flanges 152 on the upper edge portion thereof at the corners and at positions opposite to each other in the vehicle width direction. Moreover, the second air cleaner case 133 includes attachment holes 153 (only one of them is illustrated) in side faces thereof in the vehicle width direction. The coupling tube 116 and the connecting tube 117 are fixed to the attachment holes 153, respectively. Furthermore, a breather hose 154 and a drain tube 158 are connected to a bottom portion of the second air cleaner case 133. The breather hose 154 is fixed with clips 155, 155, and the drain tube 158 has an end closed with a plug 156 and is fixed with hose clamps 157, 157.

The second lid 134 is formed in a plate shape covering the upward opening of the second air cleaner case 133, and includes attachment holes 159 at the corners and at positions opposite to each other in the vehicle width direction. The second lid 134 is mounted on the second air cleaner case 133 with a sealing member 160 sandwiched between the second lid 134 and the upper edge portion of the second air cleaner case 133, and is fixed thereto with five tapping screws 161 screwed into the flanges 152 of the second air cleaner case 133 through the attachment holes 159 of the second lid 134. Note that, reference numeral 162 in the drawing denotes a dust cover disposed inside of the second air cleaner case 133.

The connecting tube 117 is formed of an elastic member such as rubber in a cylindrical shape. The connecting tube 117 is fitted, at one end portion thereof, into the corresponding one of the attachment holes 153 of the second air cleaner case 133, and is joined, at the other end portion thereof, to the throttle valve unit 19 (refer to FIG. 8). In this state, the connecting tube 117 connects the second air cleaner chamber 112 to the throttle valve unit 19 with hose bands 163 fitted on the connecting tube 117.

The snorkel tube 171 formed of an elastic member such as rubber in a cylindrical shape is provided between the first air cleaner chamber 111 and the snorkel duct 170. The snorkel tube 171 is fitted, at one end portion thereof, to the corresponding one of the attachment holes of the first air cleaner case 131, and is joined, at the other end portion thereof, to the snorkel duct 170. In this state, the snorkel tube 171 connects the first air cleaner chamber 111 to the snorkel duct 170 with a hose band 172 fitted onto the snorkel tube 171. Note that, the cover 114 of the snorkel 113 is disposed inside a snorkel guard 173, and the snorkel duct 170 is attached to the rear rising portion 51b of the corresponding side frame 51 with a stay 174 interposed therebetween.

In the air cleaner 110 as described above, external air is introduced from the snorkel 113; then dust in the air thus introduced is removed by the air cleaner element 115 in the first air cleaner chamber 111; the purified air is guided to the second air cleaner chamber 112 through the coupling tube 116, and thereafter, is supplied to the internal combustion engine 13 from the connecting tube 117.

Since the air cleaner 110 is constituted of: the first air cleaner chamber 111 disposed outward of the corresponding lower frame 34 in the vehicle width direction and the second air cleaner chamber 112 disposed inward thereof in the vehicle width direction. Accordingly, the air cleaner 110 having a large capacity can be compactly disposed in a narrow space surrounded by the frames. In addition, since the first air cleaner chamber 111 is disposed outward of the corresponding rear upright frame 76 in the vehicle width direction, a large space for maintenance of the air cleaner 110 can be secured. For this reason, a maintenance operation can be easily performed on the air cleaner 110, that is, the air cleaner 110 has an excellent maintainability.

It should be noted that the above-described effect can be obtained even when the first and second cleaner chambers 111 and 112 are disposed to sandwich a part of the corresponding lower frame 34 or of the corresponding rear upper frame 75 instead of the rear upright frame 76, in accordance with the position where these chambers 111 and 112 are attached.

Figure 12:
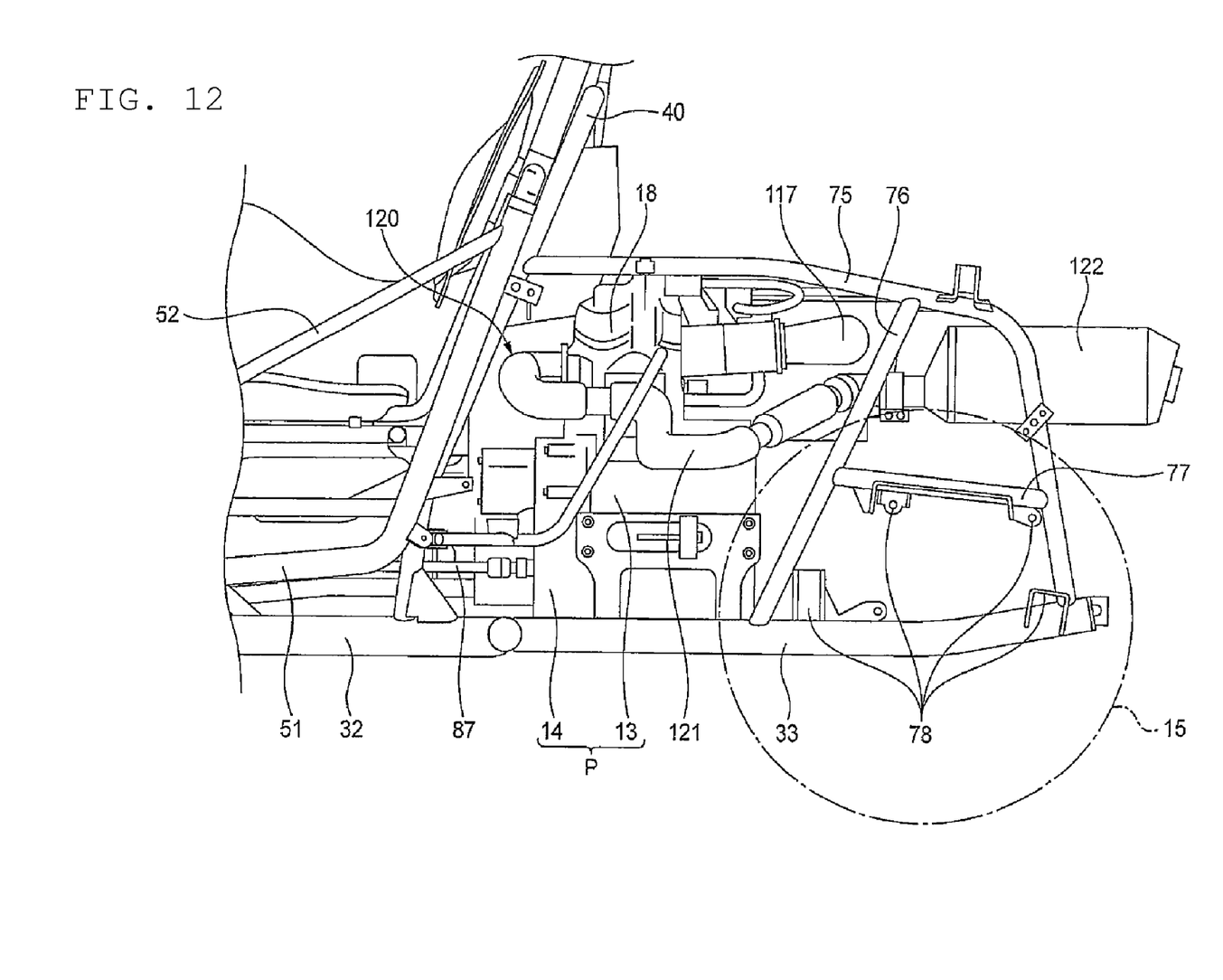
FIG. 12 is a side view illustrating, in an enlarged manner, a rear frame portion illustrated in FIG. 1.

Moreover, as illustrated in FIGS. 8 and 12, the exhaust pipe 120 connected to the front portion of the cylinder head 18 first extends frontward, thereafter turns around and extends rearward, is further bent at substantially 90°, and linearly extends to the outside of the vehicle body while being inclined downward with respect to the horizontal plane. Moreover, after reaching a region behind the driver's seat 9 in the vehicle width direction, the exhaust pipe 120 is bent to the inside of the vehicle body and linearly extends back substantially onto the center line CL of the vehicle body while being inclined upward, and is then connected to a muffler 122 disposed to extend in the front-rear direction substantially on the center line CL of the vehicle body in the rear frame portion 4. With this arrangement, an outermost extending portion 121 of the exhaust pipe 120 extends to a region inside a rearward extension line of the corresponding side frame 51 in the vehicle width direction and outside the corresponding rear upper frame 75 in the vehicle width direction.

Accordingly, a required length can be secured for the exhaust pipe 120 even in, for example, the vehicle 1 having the lowered floor, in which the space in the rear frame portion 4 is limited with the internal combustion engine 13 disposed behind the occupant seats 11. Moreover, having many straight portions, the exhaust pipe 120 can be easily processed, so that the number of assembly processes can be reduced and that the manufacturing costs thus can be suppressed.

The outermost extending portion 121 of the exhaust pipe 120 extends to the region inside the rearward extension line of the corresponding side frame 51 in the vehicle width direction and outside the corresponding rear upper frame 75 in the vehicle width direction. With this arrangement, the exhaust pipe 120 is protected while the length of the exhaust pipe 120 is sufficiently secured.

In addition, the exhaust pipe 120 extends back substantially onto the center line CL of the vehicle body within a region in front of the rear upright frames 76. This makes it possible to securely prevent an interference of the exhaust pipe 120 with the rear-wheel suspension system disposed rearward of the rear upright frames 76.

As described above, in the intake structure of a vehicle according to the embodiment, the air cleaner 110 includes the first air cleaner chamber 111 and the second air cleaner chamber 112, and the first air cleaner chamber 111 and the second air cleaner chamber 112 are disposed to sandwich a part of the vehicle body frame 30. Accordingly, the air cleaner 110 having a required capacity secured can be disposed compactly even when the space surrounded by the vehicle body frame 30 is narrow.

Moreover, the air cleaner 110 is disposed behind the driver's seat 9 or the passenger seat 10 and on a side of the internal combustion engine 13 located substantially on the center line CL of the vehicle body in the rear frame portion 4. In addition, the first air cleaner chamber 111 and the second air cleaner chamber 112 are disposed to sandwich, in the vehicle width direction, a part of the lower frames 34, the rear upper frames 75, or the rear upright frames 76. Accordingly, it is possible to compactly dispose the air cleaner 110 in the rear frame portion 4 having a space limited due to a lowered floor and compactification, and thus to secure a required predetermined capacity for the air cleaner 110.

Furthermore, since the air cleaner element 115 is disposed in the first air cleaner chamber 111 disposed outward of the corresponding lower frame 34, the corresponding rear upper frame 75, or the corresponding rear upright frame 76 in the vehicle width direction, it is possible to secure a wide space for maintaining the air cleaner 110, and thus to secure a favorable maintainability. In addition, since the second air cleaner chamber 112 is disposed inward of the corresponding lower frame 34, the corresponding rear upper frame 75, or the corresponding rear upright frame 75 in the vehicle width direction, it is possible to secure a required predetermined capacity, as in the case of the first air cleaner chamber 111.

A first embodiment of the present invention provides an intake structure of a vehicle including: a vehicle body frame; a pair of occupant seats being arranged side by side in a vehicle width direction in the vehicle body frame, and constituting a driver's seat and a passenger seat; an internal combustion engine for generating a driving force; and an air cleaner for purifying air and supplying the purified air to the internal combustion engine. Moreover, the air cleaner includes a first air cleaner chamber and a second air cleaner chamber that are disposed to sandwich a part of the vehicle body frame.

A second embodiment of the present invention provides the following characteristic in addition to the configuration of the first aspect. Specifically, the intake structure of a vehicle further includes: a pair of lower frames constituting the vehicle body frame, and being disposed respectively in left and right lower portions of the vehicle body so as to extend in a front-rear direction; a pair of left and right rear upper frames extending upward respectively from rear ends of the lower frames, thereafter, being bent in such a manner as to cover the internal combustion engine, and then extending frontward; and a pair of rear upright frames coupling the respective rear upper frames to the corresponding lower frames. In addition, the internal combustion engine is disposed behind the occupant seats and supported substantially on a center line of a vehicle body in the rear frame portion. Moreover, the air cleaner is disposed behind any one of the driver's seat and the passenger seat and on a side of the internal combustion engine, while the first air cleaner chamber and the second air cleaner chamber are disposed to sandwich, in the vehicle width direction, a part of any one of a corresponding one of the lower frames, a corresponding one of the rear upper frames, and a corresponding one of the rear upright frames.

A third embodiment of the present invention provides the following characteristic in addition to the configuration of the first aspect. Specifically, the intake structure of a vehicle further includes: an air cleaner element for removing dust in air, the air cleaner element being disposed inside the first air cleaner chamber; a coupling tube allowing the first air cleaner chamber and the second air cleaner chamber to communicate with each other therethrough; and a connecting tube allowing the second air cleaner chamber and the internal combustion engine to communicate with each other therethrough so as to supply the purified air to the internal combustion engine. In addition, the first air cleaner chamber is disposed outward of any one of the corresponding lower frame, the corresponding rear upper frame, and the corresponding rear upright frame, in the vehicle width direction, while the second air cleaner chamber is disposed inward of the one of the corresponding lower frame, the corresponding rear upper frame, and the corresponding rear upright frame, in the vehicle width direction.

According to the first embodiment of the present invention, the air cleaner includes the first air cleaner chamber and the second air cleaner chamber, and the first air cleaner chamber and the second air cleaner chamber are disposed to sandwich a part of the vehicle body frame. Accordingly, the air cleaner having a required capacity secured can be disposed compactly even when a space surrounded by the vehicle body frame is narrow.

According to the second embodiment of the present invention, the air cleaner is disposed behind any one of the driver's seat and the passenger seat, and on a side of the internal combustion engine located substantially on the center line of the vehicle body in the rear frame portion, while the first air cleaner chamber and the second air cleaner chamber are disposed to sandwich, in the vehicle width direction, a part of any one of a corresponding one of the lower frames, a corresponding one of the rear upper frames, and a corresponding one of the rear upright frames. Accordingly, it is possible to compactly dispose the air cleaner in the rear frame portion having a space limited due to a lowered floor and compactification, and thus to secure a required predetermined capacity for the air cleaner.

According to the third embodiment of the present invention, the air cleaner element is disposed in the first air cleaner chamber disposed outward of the one of the corresponding lower frame, the corresponding rear upper frame, and the rear upright frame, in the vehicle width direction, it is possible to secure a wide space for maintaining the air cleaner, and thus to secure a favorable maintainability. In addition, since the second air cleaner chamber is disposed inward of the one of the corresponding lower frame, the corresponding rear upper frame, and the rear upright frame, in the vehicle width direction, it is possible to secure a required predetermined capacity, as in the case of the first air cleaner chamber.

It should be noted that the present invention is not limited to the above-described embodiment, and modification, improvement, and the like may be made thereon as appropriate. For example, although the present invention has been described so far as being applied to an MUV (multi utility vehicle), the present invention is not limited to this but may be applied to any type of vehicle having four or more wheels in the same manner.

What is claimed as new and is desired to be secured by Letters Patent of the United States is:

1. An intake structure for a vehicle comprising:
   a vehicle body frame;
   a pair of occupant seats arranged side by side in a vehicle width direction in the vehicle body frame and comprising a driver's seat and a passenger seat;
   an internal combustion engine configured to generate a driving force; and
   an air cleaner configured to purify air and supply the purified air to the internal combustion engine, the air cleaner including a first air cleaner chamber and a second air cleaner chamber that are disposed to sandwich a part of the vehicle body frame,
   wherein the internal combustion engine is disposed behind the occupant seats and located substantially on a center line of the vehicle body frame,
   wherein the air cleaner is disposed behind one of the driver's seat and the passenger's seat,
   wherein the first air cleaner chamber and the second air cleaner chamber are both located outward of the internal combustion engine in the vehicle width direction.

2. The intake structure for a vehicle according to claim 1, further comprising:
   an air cleaner element disposed inside the first air cleaner chamber and configured to purify the air by capturing dust in the air;
   a coupling tube connecting the first air cleaner chamber and the second air cleaner chamber; and
   a connecting tube connecting the second air cleaner chamber and the internal combustion engine so as to supply the purified air to the internal combustion engine,
   wherein the first air cleaner chamber is disposed outward of the part of the vehicle body frame in the vehicle width direction, and the second air cleaner chamber is disposed inward of the part of the vehicle body frame in the vehicle width direction.

3. An intake structure for a vehicle comprising:
   a vehicle body frame;
   a pair of occupant seats arranged side by side in a vehicle width direction in the vehicle body frame and comprising a driver's seat and a passenger seat;
   an internal combustion engine configured to generate a driving force; and
   an air cleaner configured to purify air and supply the purified air to the internal combustion engine, the air cleaner including a first air cleaner chamber and a second air cleaner chamber that are disposed to sandwich a part of the vehicle body frame,
   wherein the vehicle body frame further comprises,
      a pair of left and right lower frames arranged respectively at left and right lower positions in a vehicle body and extending in a front-rear direction of the vehicle body;
      a pair of left and right rear upper frames extending upward respectively from rear ends of the left and right lower frames and being bent so as to extend frontward, thereby covering the internal combustion engine;
      a pair of left and right rear upright frames coupling the respective left and right rear upper frames to the respective left and right lower frames; and
      a rear frame portion defined by the left and right lower frames, the left and right rear upper frames, and the left and right rear upright frames,
   wherein the internal combustion engine is disposed behind the occupant seats and located substantially on a center line of the vehicle body and substantially in the rear frame portion, and
   wherein the air cleaner is disposed behind one of the driver's seat and the passenger seat and on one side of the internal combustion engine in the vehicle width direction, the part of the vehicle body frame comprising any one of a part of the left lower frame, a part of the right lower frame, a part of the left rear upper frame, a part of the right rear upper frame, a part of the left rear upright frame, and a part of the right rear upright frame.

4. The intake structure for a vehicle according to claim 3, further comprising:
   an air cleaner element disposed inside the first air cleaner chamber and configured to purify the air by capturing dust in the air;
   a coupling tube connecting the first air cleaner chamber and the second air cleaner chamber; and
   a connecting tube connecting the second air cleaner chamber and the internal combustion engine so as to supply the purified air to the internal combustion engine,
   wherein the first air cleaner chamber is disposed outside the rear frame portion in the vehicle width direction, and the second air cleaner chamber is disposed inside the rear frame portion in the vehicle width direction.

* * * * *